3,621,798
FURNACES FOR THE COMBUSTION AND DESTRUCTION OF WASTE MATERIALS

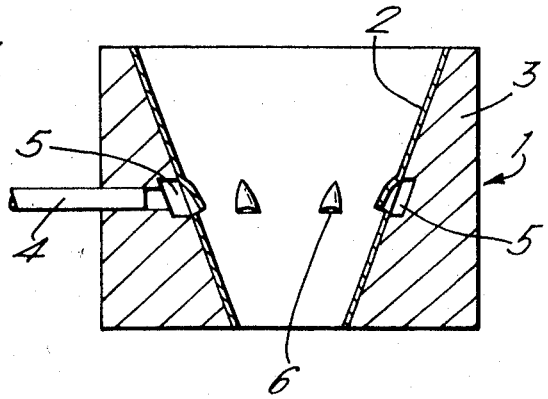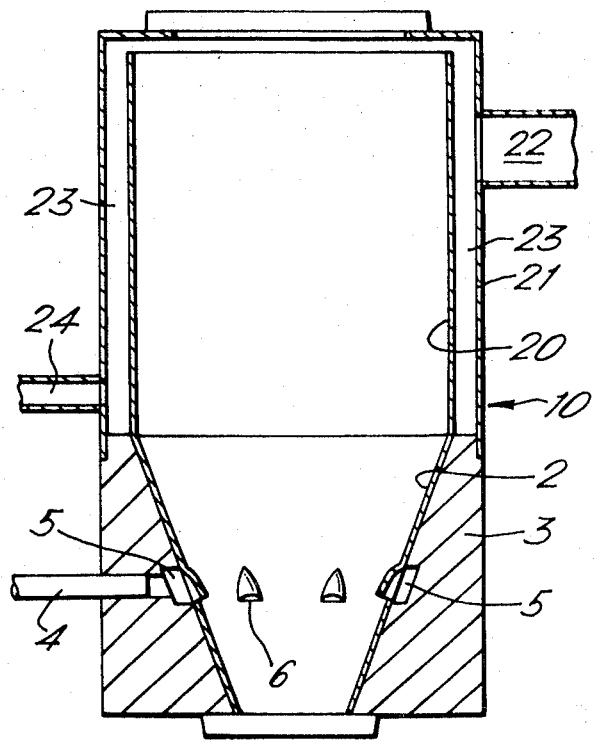

Frode Pedersen, Oslo, Norway, assignor to
A. S. Mustads Fabrikker, Oslo, Norway
Filed Sept. 16, 1969, Ser. No. 858,441
Int. Cl. F23g 5/00
U.S. Cl. 110—8 R          7 Claims

ABSTRACT OF THE DISCLOSURE

A furnace is disclosed, intended for the combustion and destruction of waste materials, the furnace being provided with an external heat source and a downwardly tapering combustion chamber. The combustion chamber is provided with a separate removable mantle of sheet material supported by the refractory lining of the furnace. The combustion chamber may be extended upwardly by two coaxial mantles, the inner mantle being removable and preferably made in one piece with the tapering mantle portion. Combustion air is fed to the combustion chamber through slots in the tapering mantle portion.

---

The present invention relates to furnaces for the combustion and destruction of waste materials, such furnaces being provided with an adjustable heat source, such an electrical or high frequency heating elements or gas or oil burners, disposed outside the combustion chamber of the furnace.

In furnaces of this kind the cross sectional area is usually constant along the vertical axis of the combustion chamber and there will thereafter often be a tendency for the combustion goods to be burnt only in the outer portions, a "mushroom" of non-burnt goods being left at a distance from the walls of the combustion chamber. Due to this distance the heat transfer from the heat source will be severely reduced so that the combustion of the goods will have a tendency to cease.

Further it is known for furnaces of the kind referred to above that at least part of the combustion chamber is provided with a downwardly tapering cross section.

The object of the present invention is to provide a furnace of the kind referred to above in which the air supply passages to the combustion chamber is protected against clogging, in which the refractory lining is protected against destruction and in which the heating elements, if such are used, are disposed in grooves or recesses in the refractory lining and are thus protected against contamination and corrosive attacks whereby a possible short circuiting is prevented. Further it is an object to provide a furnace the cleaning of which is simple.

These and other objects are achieved by providing the furnace of the invention, in the region of the adjustable heat supply, with a separate removable inner mantle of sheet metal and having an evenly decreasing cross sectional area in the downward direction, the removable mantle being supported over substantially the full outer surface by the refractory lining. The supply of combustion air is conveniently effected at the tapering portion of the combustion chamber through one or more passages in the refractory lining and therefrom through slots in the removable mantle, each such passage conveniently being provided with a distribution chamber opening directly to the slots which are preferably formed as inwardly and downwardly opening slots.

In a further embodiment of the furnace of the invention the combustion chamber is extended upwardly from the tapering portion, the extension being formed by an inner mantle in conjuncton with the removable tapering mantle and an outer mantle coaxial with and spaced from the inner mantle, such inner and outer mantles having a substantially constant cross sectional area. The exhaust opening from the furnace of this embodiment is conveniently disposed in the outer mantle below the upper edge thereof, whereas the upper edge of the inner mantle is disposed at a higher level than the uppermost point of the exhaust opening in the outer mantle.

The invention will now be described with reference to the accompanying drawing in which FIGS. 1 and 2 show axial sectional views through two embodiments of the furnace.

In FIG. 1 an embodiment of a combustion furnace 1 is shown in accordance with the invention which is provided with an external adjustable source for the supply of heat to the combustion chamber. The furnace 1 is provided, in the region of the adjustable heat supply, with an evenly decreasing cross sectional area in the downward direction and comprises in this region is removable separate mantle 2 of sheet metal, supported in a correspondingly formed refractory lining 3. The lining is, in a manner known per se provided with grooves or recesses (not shown) for receiving the source of heat supply, e.g. electric of high frequency heating elements or a gas or oil burner.

The combustion chamber formed by the mantle 2 is provided with closures (not shown) at the upper and lower ends, so that the combustion chamber is completely closed when the furnace is in operation.

For the supply of combustion air during the combustion one or more passages 4 are provided in the lining 3, each passage 4 opening to a distribution chamber 5 surrounding the mantle 2. Opposite the distribution chamber 5 the mantle 2 is provided with a number of slots 6 opening downwardly and inwardly into the combustion chamber, the sheet material of the mantle immediately above the slots 6 having been pressed inwardly into the combustion chamber. Therefore, the air passing into the combustion chamber from the passages 4 and the distribution chamber 5 will be directed downwardly and the slots 6 will not be clogged by combustion goods or residues during passage thereof downwardly through the combustion chamber during the combustion. By providing the air supply passages 4 in the refractory lining 3 the combustion air will to a certain extent be preheated before entering the combustion chamber. The passage or passages 4 may in a manner known per se be provided with air feeding means and/or feed adjustment means, not shown, to provide an adjusted air supply during the combustion.

The combustion chamber may, as shown in FIG. 1, consist of merely the evenly tapering portion, or it may be provided with an extension of the combustion chamber above the tapering portion. In both cases however the external heat supply is restricted to the tapering portion of the combustion chamber.

An embodiment of a furnace according to the invention, with an extension as referred to above is shown in FIG. 2.

The furnace 10 of FIG. 2 comprises a lower portion similar to the furnace of FIG. 1 so that the same references are used for identical parts. In conjunction with the mantle 2 and located thereabout is an inner mantle portion 20 having a substantially constant cross section and an outer mantle portion 21 disposed coaxially with and spaced from the inner mantle portion 20 and also having a substantially constant cross section. The inner mantle portion 20 is conveniently made in one piece with the tapering mantle 2 in the lower portion of the furnace and is also removably disposed in the furnace. In this embodiment the exhaust opening 22 of the furnace is disposed in the outer mantle 21 below the upper edge thereof whereas the upper edge of the inner mantle 2, 20 is disposed at a higher level than that of the uppermost point of the exhaust opening 22. The action thereby effected on the exhaust gases from the combustion chamber causes reduced conveyance of ashes and similar particles to the exhaust passage.

The space 23 between the two mantles 20 and 21 may be supplied with air through an air supply passage 24 disposed near the lower edge of the outer mantle 21. By not supplying any air to the space 23 an insulating air cushion will be formed in such space, and by feeding air to the space 23 through the passage 24 after completed combustion process a cooling effect will be achieved.

By disposing the mantle 2 or 21, respectively, removably in the furnace the mantle may freely expand axially relative to the remainder of the furnace. The refractory lining 3 and possible spacers, not shown, in the space 23 provides for correct location of the mantle 2 or 2 and 21, respectively with respect to i.e. the combustion air passage 4, 5. By disposing the mantle 2 or 2 and 21, respectively removably in the furnace, cleaning and maintenance of the furnace is also simplified.

I claim:

1. A furnace for the combustion and destruction of waste materials wherein the furnace has a combustion chamber and an adjustable heat source for supplying heat thereto, the furnace also having a refractory lining with means thereon for receiving said heat source, said combustion chamber being provided, in the region of the heat source, with an inner sheet metal mantle having a constantly decreasing cross-section tapering in the downward direction, said inner mantle being supported along substantially its entire outer surface by said refractory lining, and said mantle being separately and removably disposed in said combustion chamber, said refractory lining being provided with passages for the supply of combustion air, and said mantle having slots therein in communication with said passages.

2. The furnace of claim 1 in which each air supply passage in the refractory lining comprises a distribution chamber opening directly to the slots in said mantle.

3. The furnace of claim 2 in which each distribution chamber has an evenly decreasing cross sectional area from the inlet from the respective air supply passage.

4. The furnace of claim 1 in which the slots are formed as inwardly and downwardly opening slots.

5. The furnace of claim 1 in which the combustion chamber is extended upwardly from the heat supply region and the furnace being provided in this extension with an inner mantle in conjunction with the separate tapering mantle and with an outer mantle being co-axial with and at a distance from the inner mantle, the said inner and outer mantles having substantially constant cross section.

6. The furnace of claim 5 in which an exhaust opening from the combustion chamber is disposed in the outer mantle below the upper edge thereof, the upper edge of the inner mantle being at a higher level than the uppermost point of the exhaust opening in the outer mantle.

7. The furnace of claim 5, means being provided for supplying fresh air to the space between the outer and inner mantles.

References Cited

UNITED STATES PATENTS 3,357,379　12/1967　Wiley, Jr. _____ 110—8

FOREIGN PATENTS 19,083　1913　Great Britain _____ 110—8

KENNETH W. SPRAGUE, Primary Examiner

U.S. Cl. X.R.

110—18 R